Patented Nov. 13, 1951

2,574,847

UNITED STATES PATENT OFFICE 2,574,847

COPOLYMERS OF STYRENE OR DERIVATIVE THEREOF AND AN ESTER OF AN ABIETYL ALCOHOL AND AN $\alpha,\beta$-ETHYLENICALLY UNSATURATED CARBOXYLIC ACID Glenwood L. Schertz, Wilmington, Del., assignor to Hercules Powder Company, Wilmington, Del., a corporation of Delaware No Drawing. Application December 24, 1948, Serial No. 67,246

16 Claims. (Cl. 260—27)

This invention relates to new compositions of matter. More particularly, the invention relates to copolymers of styrene or a derivative thereof and an ester derived by esterifying an abietyl alcohol and an $\alpha,\beta$-ethylenically unsaturated carboxylic acid and to a process for the preparation of such copolymers.

In accordance with this invention, copolymers of styrene or a derivative thereof and an ester derived by esterifying an abietyl alcohol and an $\alpha,\beta$-ethylenically unsaturated carboxylic acid have been prepared. These new copolymers may be prepared by polymerizing either in bulk or in solution in a solvent such an ester with styrene or a suitable derivative thereof. These new copolymers are clear, light-colored resins which are characterized by color stability and solubility in hydrocarbon solvents. At the same time they possess pigment wetting and film-forming properties. Furthermore, certain of these new resins are soluble or dispersible in drying oils. Accordingly, these new copolymers may be employed as compounding ingredients in the production of superior oleoresinous varnishes and coating compositions derived therefrom.

Any $\alpha,\beta$-ethylenically unsaturated carboxylic acid may be esterified with an abietyl alcohol to produce an ester from which the new copolymers of this invention may be prepared. Thus, $\alpha,\beta$ - ethylenically unsaturated polycarboxylic acids such as maleic, fumaric, itaconic, citraconic, etc. acids may be employed, as may be $\alpha,\beta$-ethylenically unsaturated monocarboxylic acids such as acrylic, $\alpha$-methylacrylic, $\beta$-methylacrylic, $\alpha,\beta$-dimethylacrylic, $\beta,\beta$-dimethylacrylic, $\beta$-ethylacrylic, $\alpha$-hexenoic, etc. acids. Of the rather broad class of acids which are operable, the acids having five or less carbon atoms, including the carboxyl carbons, are preferred and particularly preferred are such acids which are also dicarboxylic in nature. Substituted acids may be employed if the substituent or substituents thereof are of such a nature that they are not reactive in the esterification of the acid with an abietyl alcohol or in the subsequent polymerization of the resultant ester with styrene or derivative thereof, an example of such a nonreactive acid being monochloromaleic acid. When esters of dicarboxylic acids are employed, they may be employed in the form of either mono- or diesters; i. e., either acid or neutral form. Acid anhydrides may, of course, be used as equivalents for the acids themselves in preparing the esters which are intermediates for the products of this invention. The most preferred esters are those derived from maleic acid, maleic anhydride or fumaric acid.

The term "an abietyl alcohol" is employed herein to designate those alcohols which are derived from abietic acid, hydrogenated abietic acid, dehydrogenated abietic acid, or any of the esters, salts or anhydrides of the aforesaid acids. Thus, the term includes abietyl alcohol, dihydroabietyl alcohol, tetrahydroabietyl alcohol, dehydroabietyl alcohol, or mixtures of such alcohols. Any of the procedures known to the art for effecting the hydrogenation of the aforesaid acids or derivatives thereby to yield alcohols may be employed. For example, the sodium reduction of esters of the aforesaid acids according to the well-known general method of Bouveault and Blanc may be employed. See in this connection U. S. 2,021,100, issued November 12, 1935. The abietyl alcohols employed in this invention may also be conveniently prepared by the hydrogenation, in the presence of a hydrogenation catalyst, of the aforesaid acids, their esters, salts or anhydrides according to the methods described in U. S. 2,358,234 and U. S. 2,358,235, issued September 12, 1944. When such catalytic hydrogenation procedures are employed, it is possible to partially or completely saturate the ethylenic double bonds of the acids or their derivatives at the same time that the reduction of the carboxyl group to the alcohol group is being effected if the proper conditions are employed.

Although substantially pure abietic acid or the aforementioned derivatives thereof may be employed in producing the abietyl alcohols used in this invention, it is more desirable from an economic standpoint to employ abietic acid-containing materials such as the various grades of wood or gum rosin available commercially or suitable derivatives thereof as; for example, hydrogenated rosin, dehydrogenated rosin, esters of any of the aforesaid rosins, salts of the aforesaid rosins, or anhydrides of the aforesaid rosins. Thus, it will be understood that for present purposes wood or gum rosin is to be considered as abietic acid; dehydrogenated wood or gum rosin is to be considered as dehydroabietic acid; a hydrogenated wood or gum rosin is to be considered as a hydroabietic acid; esters of wood or gum rosin are to be considered as esters of abietic acid, etc. It will further be understood that any of the natural resin acids other than abietic acid which occur in wood or gum rosin, such acids being l-pimaric acid, d-dimaric acid, sapinic acid, etc. may be used equivalently for abietic acid.

As indicated above, hydrogenated abietic acid or any of the esters, salts or anhydrides thereof may be used in preparing suitable abietyl alcohols for use in this invention. Suitable procedures for hydrogenating the ethylenic double bonds of abietic acid or its derivatives are known to the art as, for example, those disclosed in U. S. 2,094,117 and U. S. 2,155,036. It will be recognized that abietyl alcohol can first be prepared from abietic acid or its esters, salts or its anhydride and the alcohol itself treated with hydrogen to effect the desired degree of hydrogenation of the ethylenic bonds.

Dehydrogenated abietic acid or any of the esters, salts or the anhydride thereof have been stated to be useful in preparing suitable abietyl alcohols for use in accordance with the invention. Suitable procedures for dehydrogenating abietic acid or its derivatives are known to the art. Thus, it is possible to effect substantial dehydrogenation of these compounds by treating the same with an active hydrogenation catalyst under conditions of reaction adapted to produce an ultra- and inter-molecular rearrangement of the hydrogen atoms in the resin acid nuclei of the compounds and in the absence of added substances capable of reducing the ethylenic unsaturation of the compounds under the conditions of treatment. See U. S. 2,154,629 in this connection. This treatment is sometimes referred to as disproportionation. Certain types of heat-treatment also effect dehydrogenation of abietic acid and its derivatives. It will again be recognized that abietyl alcohol can first be prepared from abietic acid or its esters, salts or its anhydride and the alcohol itself dehydrogenated to form dehydroabietyl alcohol for use in accordance with this invention.

In the preparation of the copolymers, ring-substituted styrenes as well as styrene itself may be employed. Thus, in general, compounds having the following structure

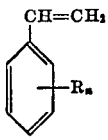

where R is a substituent on the phenyl group and may be hydrogen, halo or methyl and $n$ is an integer from 1 to 3 inclusive, may be employed. Hence, the following specific compounds among others may be employed p-methylstyrene, o-methylstyrene, 2,4-dimethylstyrene, p-chlorostyrene and 3,5-dichlorostyrene.

Having thus described the nature and purpose of this invention, the following examples are offered as illustrative thereof.

The "hydroabietyl ester" to which reference is made in the ensuing Examples I–IV, inclusive, was the di-ester prepared by esterifying "hydroabietyl alcohol" with a chemically equivalent amount of maleic anhydride. The esterification was effected by maintaining the reactants at a temperature of from about 200° C. to about 225° C. for about 5 hours. The "hydroabietyl alcohol" was a commercial product obtained by the hydrogenolysis of the methyl ester of rosin and contained approximately 38% of tetrahydroabietyl alcohol, 34% of dihydroabietyl alcohol 12% of dehydroabietyl alcohol, and 16% of nonalcoholic materials.

All parts and percentages are by weight unless otherwise indicated.

*Example I*

A copolymer was prepared from a monomer mixture containing 25% of styrene and 75% of hydroabietyl ester by a solution polymerization process. Thus, a solution of 536 g. of hydroabietyl ester and 179 g. of styrene in 385 g. of toluene was heated to 100° C. in a glass reaction vessel and 7.2 g. (1% of the total weight of the monomers) of benzoyl peroxide was added. After the addition of the benzoyl peroxide was completed, the reaction mixture was raised to a temperature of 125° C. and maintained at that point for four hours. At the termination of the four-hour reaction period, the toluene solvent was removed by vacuum distillation. A mild $CO_2$ sparge was employed near the end of this solvent removal process, at which point distillation was taking place at a temperature of about 200° C. under a pressure of about 25 mm. of mercury.

By the above-described process, 687 g. of hydroabietyl ester-styrene copolymer was obtained. This copolymeric material was a clear, light-colored resin characterized by a softening point of 118° C. and a color of 2.5 Amber (Lovibond scale) using a 7/8" cube.

*Example II*

A copolymer was prepared from equal portions of hydroabietyl ester and styrene in a manner similar to that described in Example I. Thus, a solution of 162 g. of hydroabietyl ester and 162 g. of styrene in 175 g. of xylene was heated to a temperature of 100° C. in a glass reaction vessel. Three and two-tenths g. of benzoyl peroxide (1% of the total weight of the monomers) was then added to the reaction mixture and the temperature was raised to about 125° C. and maintained within the range from about 125° C. to about 130° C. for four hours. At the termination of this four-hour reaction period, the xylene solvent was removed by the same method as that described in Example I for the removal of the toluene solvent therein employed. By this means was obtained 300 g. of clear, light-colored copolymeric material which was characterized by a softening point of 147° C. and a color of 2 Amber (Lovibond scale) using a 7/8"cube.

*Example III*

A 75% solution of hydroabietyl ester in toluene which contained 20 g. of hydroabietyl ester was admixed with 370 g. of styrene in a glass reaction vessel. The temperature of this mixture was raised to about 115° C. and 3.9 g. (1% of the combined weight of the monomers) of benzoyl peroxide was added. The temperature of the reaction mixture was then raised to the reflux temperature of about 125° C. to about 130° C. After the reaction mixture had refluxed for about one hour, 3.9 additional grams of benzoyl peroxide dissolved in 101 g. of toluene was added and the reaction mixture was refluxed for three additional hours. The toluene solvent was then removed in the same manner as that described in Example I.

By this means 365 g. of a copolymeric product was obtained. This product, which was formulated from a monomer mixture containing 95% styrene and 5% hydroabietyl ester, was characterized by a color of 0.25 Amber (Lovibond scale) using a 7/8" cube, and a softening point of 175° C. This resin was not completely soluble in mineral spirits or other aliphatic hydrocarbon solvents. However, it was soluble in aromatic solvents such as benzene, toluene, and in mixtures thereof with mineral spirits.

*Example IV*

A solution of 300 g. of hydroabietyl ester and 700 g. of styrene in 177 g. of (Solvesso 100) was prepared in a glass reaction vessel. This solution accordingly contained 85% monomers and 15% solvent. The temperature of this solution was raised to 140–145° C., a point just under the reflux temperature. The temperature was then gradually increased to 180–190° C. in three hours' time. It was held at this temperature for an additional five hours' time. At the termination of this reaction period, the solvent was removed from the reaction mixture by vacuum distillation at a temperature of 250° C. Nineteen hundred g. of a hard clear resinous copolymeric product was obtained. It was characterized by a softening point of 170°–173° C. and a color of 1.5 Amber (Lovibond scale) using a 7/8" cube.

The Solvesso 100 used in this example is a highly aromatic solvent naphtha marketed by Standard Oil Co. of New Jersey. It contains 98% of aromatic hydrocarbons, has a boiling point range of 154 to 185° C., has a Kauri-butanol value of 81.5 and an aniline point of 12.0° C.

The above example illustrates that the novel copolymers with which this invention is concerned may be prepared by thermal polymerization processes in the absence of any polymerization catalyst.

The "hydroabietyl ester" to which reference is made in the following Example V was the diester prepared by esterifying "hydroabietyl alcohol" with a chemically equivalent amount of fumaric acid. The esterification was carried out at 200° C. to provide an ester having a drop melting point of 55° C. and an acid number of 6.6.

Example V

A solution of 324 g. of hydroabietyl ester in 162 g. of xylene was prepared in a glass reaction vessel. The solution was heated to 130° C. at which point 3.7 g. of benzyl peroxide was added. Thereafter, 44 g. of styrene were added slowly while maintaining the temperature at 130° C. After all the styrene had been added, the mixture was held for an additional four hours at 130–147° C. The solvent was removed by distillation at reduced pressures, the final stripping temperature being 200° C. at 30 mm. The resin was clear and very light in color having a drop melting point of 83° C.

The copolymers with which this invention is concerned may be prepared from mixtures of the two monomers which contain from about 5% to about 95% by weight of styrene or derivative thereof. It is preferable, however, that the ester derived by esterifying an abietyl alcohol and an α,β-ethylenically unsaturated carboxylic acid employed in the preparation of the copolymers of this invention constitutes from about 20% to about 80% of the total weight of the monomers utilized. The various physical and chemical properties of the copolymer will, of course, fluctuate to some extent as the relative proportions of the monomers are varied. Thus, the copolymer prepared from 95% of the ester and 5% of styrene will differ substantially from a corresponding copolymer formulated from 95% styrene or derivative thereof and 5% of the ester. It is quite significant, however, that all of the copolymers with which this invention is concerned are characterized by novel and unexpected properties. Thus, a copolymer formulated from a monomer mixture containing from about 5% to about 60% styrene or derivative thereof is completely soluble in low cost hydrocarbon solvents such as mineral spirits, V. M. & P. naphtha, etc. and is characterized by film-forming and color stability properties far superior to those of, for example, the abietyl resins previously known. Copolymers formulated from a monomer mixture containing from 60% to 95% styrene or derivative thereof require a mixture of low cost hydrocarbon solvents and aromatic solvents such as benzene, toluene, etc. to effectively dissolve them. Polystyrene, on the contrary, is insoluble in low cost hydrocarbon solvents such as mineral spirits, V. M. & P. naphtha, etc. The copolymers of this invention prepared from monomer mixtures containing 30% or less styrene or derivative thereof are soluble or dispersible in drying oils such as linseed oil, soya bean oil, dehydrated castor oil. Thus, these copolymers may be used in the manufacture of oleoresinous varnishes and other coating compositions derived therefrom. Such coating compositions are characterized by excellent gloss, toughness, etc.

As previously mentioned, any ester derived by esterifying an abietyl alcohol and an α,β-ethylenically unsaturated carboxylic acid may be copolymerized with styrene or derivative thereof to produce the novel compositions of this invention. Conventional esterification procedures may be utilized to produce these esters. Thus, for example, the esters may be prepared by direct esterification; they may be prepared by ester interchange or transesterification; or they may be prepared by reacting the alcohol with an acid chloride of the acid, etc. No esterification catalyst is necessary, although one may be used, if desired. The reaction rate is usually fast enough to make it unnecessary to employ a catalyst.

The copolymerization of styrene or derivative thereof and an ester derived by esterifying an abietyl alcohol with an α,β-ethylenically unsaturated carboxylic acid is effected by contacting the monomers under copolymerizing conditions, preferably in the presence of a conventional peroxide polymerization catalyst. In general, a temperature of about 60° C. or higher is effective in bringing about the copolymerization. However, the temperature should be below that at which substantial decomposition of the reactants or copolymer product takes place. A temperature of from about 60° C. to about 140° C. is preferred, although higher temperatures, for example, 200° C. and thereabove can be effectively employed.

Various specific procedures for making the subject copolymers are shown in the examples. One of particular significance comprises first heating the desired ester, with or without solvent, up to a copolymerizing temperature and thereafter adding the styrene or derivative thereof at a controlled rate to maintain the desired temperature. If a catalyst is employed, it may be added prior to addition of the styrene or derivative thereof or concurrently therewith. If concurrent addition is employed, the catalyst and styrene or derivative thereof may be added separately or in admixture. Since the reaction here involved is quite exothermic, this technique is excellent for practical operations. A conventional peroxide polymerization catalyst may be employed if desired.

Hydrocarbon solvents such as the xylenes, toluene, benzene, n-hexane, and similar materials are preferred for the polymerization reaction mixture, although other materials which function as mutual solvents for the monomers may be employed. It is generally desired, however, that the solvent utilized constitute at least 15% of the total weight of the polymerization reaction mixture. The utilization of a lesser amount of solvent results in copolymeric products which are somewhat more viscous in nature than those prepared in the presence of higher solvent concentrations. Likewise, the copolymers prepared in the presence of solvent concentrations of less than 15% of the total weight of the polymerization reaction mixture may contain some gelled materials, whereas those copolymers prepared in the presence of solvent concentrations of at least about 15% of the weight of the polymerization reaction mixture are substantially free of such gels. Furthermore, greater uniformity in physical properties from batch to batch is obtained by the utilization of solvent concentrations of not less than about 15% of the weight of the reaction mixture. A preferable range of solvent concentration is from about 20% to about 50% of the total weight of the polymerization reaction mixture. If desired, however, the subject esters derived from an abietyl alcohol may be copolymerized with styrene in the absence of any solvent to produce the new compositions of matter with which this invention is concerned.

The conventional peroxide polymerization catalysts such as benzoyl peroxide, benzoylacetic peroxide, phthalic peroxide, succinic peroxide, tert-butyl hydroperoxide, coconut oil acid peroxides, stearic peroxide, oleic peroxide, ascaridole, and the like may be employed to facilitate the copolymerization reaction by which the novel materials of this invention are prepared. It will be understood that hydroperoxide polymerization catalysts such as tert-butyl hydroperoxide are included within the scope of the term "peroxide polymerization catalysts." A preferable range of concentration of such catalysts is from about 0.25% to about 3.0% of the combined weight of the monomers employed. However, greater or lesser amounts of peroxide catalyst may be utilized, if desired. In fact, a catalyst is not essential to the production of the copolymers of this invention. Thus, as illustrated by Example IV, styrene and an ester derived by esterifying an abietyl alcohol with an α,β-unsaturated carboxylic acid may be thermally copolymerized in the absence of any catalyst.

A serious handicap in the use of polystyrene in coatings is its lack of solubility in low-cost solvents such as mineral spirits; certain of the resins covered by this invention have excellent solubility in mineral spirits. Another advantage of this invention is that it affords a method of preparing high-molecular-weight materials containing a derivative of rosin. This high molecular weight contributes good film-forming properties.

The new copolymeric materials with which this invention is concerned constitute an important advance in the art. These new copolymers are clear, light-colored resins having film-forming properties. Certain of these resins are characterized by solubility in low cost aliphatic hydrocarbons such as mineral spirits. Another class of the resins is characterized by solubility or dispersibility in drying oils. All of the resins demonstrate superior pigment wetting properties when employed in pigmented coating compositions. Furthermore, oleoresinous varnishes and other coating compositions formulated with these new copolymers deposit films of excellent gloss and color stability. Accordingly, these unique copolymers find extensive use as compounding ingredients for oleoresinous varnishes and coating compositions derived therefrom, pigmented mineral spirit solutions utilized for sanitary white finishes, hot melt coating compositions, and the like.

It is intended that the expression "ester derived by esterifying an abietyl alcohol with an α,β-ethylenically unsaturated carboxylic acid" and similar expressions, as used herein and in the appended claims, shall be construed of sufficient breadth to cover not only esters prepared by direct esterification but also those prepared by ester interchange or transesterification, those prepared by reacting the alcohol with an acid chloride of the acid, etc. It will also be understood that wherever the term "acid" appears in this specification and claims the acid anhydride thereof is a true equivalent.

What I claim and desire to protect by Letters Patent is:

1. A copolymer of styrene and an ester derived by esterifying an abietyl alcohol with an α,β-ethylenically unsaturated carboxylic acid, said abietyl alcohol being selected from the group consisting of abietyl alcohol, dihydroabietyl alcohol, tetrahydroabietyl alcohol, dehydroabietyl alcohol, and mixtures of such alcohols, said ester being present in an amount of from 5% to 95% by weight of the copolymer.

2. A copolymer of styrene and an ester derived by esterifying an abietyl alcohol with an α,β-ethylenically unsaturated dicarboxylic acid, said abietyl alcohol being selected from the group consisting of abietyl alcohol, dihydroabietyl alcohol, tetrahydroabietyl alcohol, dehydroabietyl alcohol, and mixtures of such alcohols, said ester being present in an amount of from 5% to 95% by weight of the copolymer.

3. A copolymer of styrene and an ester derived by esterifying abietyl alcohol with an α,β-ethylenically unsaturated dicarboxylic acid, said ester being present in an amount of from 5% to 95% by weight of the copolymer.

4. A copolymer of styrene and an ester derived by esterifying abietyl alcohol with maleic acid, said ester being present in an amount of from 5% to 95% by weight of the copolymer.

5. A copolymer of styrene and the diester derived by esterifying abietyl alcohol with maleic acid, said ester being present in an amount of from 5% to 95% by weight of the copolymer.

6. A copolymer of styrene and an ester derived by esterifying a hydroabietyl alcohol with an α,β-ethylenically unsaturated carboxylic acid, said ester being present in an amount of from 5% to 95% by weight of the copolymer.

7. A copolymer of styrene and an ester derived by esterifying a hydroabietyl alcohol with fumaric acid, said ester being present in an amount of from 5% to 95% by weight of the copolymer.

8. A copolymer of styrene and a diester derived by esterifying a hydroabietyl alcohol with fumaric acid, said ester being present in an amount of from 5% to 95% by weight of the copolymer.

9. A copolymer of styrene and the diester derived by esterifying dihydroabietyl alcohol with fumaric acid, said ester being present in an amount of from 5% to 95% by weight of the copolymer.

10. A copolymer of styrene and the diester derived by esterifying tetrahydroabietyl alcohol with fumaric acid, said ester being present in an amount of from 5% to 95% by weight of the copolymer.

11. A copolymer of styrene and an ester derived by esterifying a hydroabietyl alcohol with maleic acid, said ester being present in an amount of from 5% to 95% by weight of the copolymer.

12. A copolymer of styrene and a diester derived by esterifying a hydroabietyl alcohol with maleic acid, said ester being present in an amount of from 5% to 95% by weight of the copolymer.

13. A copolymer of styrene and the diester derived by esterifying dihydroabietyl alcohol with maleic acid, said ester being present in an amount of from 5% to 95% by weight of the copolymer.

14. A copolymer of styrene and the diester derived by esterifying tetrahydroabietyl alcohol with maleic acid, said ester being present in an amount of from 5% to 95% by weight of the copolymer.

15. A copolymer of an ester derived by esterifying an abietyl alcohol with an $\alpha,\beta$-ethylenically unsaturated carboxylic acid and a compound having the following structural formula

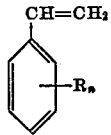

wherein R is a substituent on the phenyl group selected from the class consisting of halo and methyl and $n$ is a number from 0 to 3 inclusive, said abietyl alcohol being selected from the group consisting of abietyl alcohol, dihydroabietyl alcohol, tetrahydroabietyl alcohol, dehydroabietyl alcohol, and mixtures of such alcohols, said ester being present in an amount of from 5% to 95% by weight of the copolymer.

16. A process for the copolymerization of an ester derived by esterifying an abietyl alcohol with an $\alpha,\beta$-ethylenically unsaturated carboxylic acid and a compound having the following structural formula

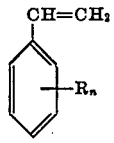

wherein R is a substituent on the phenyl group selected from the class consisting of halo and methyl and $n$ is a number from 0 to 3 inclusive, which comprises heating the monomers at a temperature of at least 60° C., said abietyl alcohol being selected from the group consisting of abietyl alcohol, dihydroabietyl alcohol, tetrahydroabietyl alcohol, dehydroabietyl alcohol, and mixtures of such alcohols, said ester being employed in the amount of from 5% to 95% by weight of the comonomers.

GLENWOOD L. SCHERTZ.

REFERENCES CITED

The following references are of record in the file of this patent:

UNITED STATES PATENTS

| Number | Name | Date |
|---|---|---|
| 2,040,849 | Holt | May 19, 1936 |
| 2,047,398 | Voss et al. | July 14, 1936 |
| 2,129,666 | Barrett et al. | Sept. 13, 1938 |
| 2,130,740 | Humphrey | Sept. 20, 1938 |
| 2,142,989 | Barrett et al. | Jan. 10, 1939 |
| 2,384,595 | Blair | Sept. 11, 1945 |
| 2,398,668 | Rust | Apr. 16, 1946 |